United States Patent
Yoshimitsu

(10) Patent No.: US 8,197,886 B2
(45) Date of Patent: Jun. 12, 2012

(54) METHOD OF MANUFACTURING SOLID ELECTROLYTIC CAPACITOR

(75) Inventor: Satoru Yoshimitsu, Saga (JP)

(73) Assignees: Sanyo Electric Co., Ltd., Moriguchi, Osaka (JP); Saga Sanyo Industries Co., Ltd., Saga (JP)

( * ) Notice: Subject to any disclaimer, the term of this patent is extended or adjusted under 35 U.S.C. 154(b) by 534 days.

(21) Appl. No.: 12/048,730

(22) Filed: Mar. 14, 2008

(65) Prior Publication Data

US 2008/0224090 A1    Sep. 18, 2008

(30) Foreign Application Priority Data

Mar. 15, 2007  (JP) ................. 2007-067062

(51) Int. Cl.
*B05D 5/12* (2006.01)
*H01G 7/00* (2006.01)

(52) U.S. Cl. ............. 427/79; 427/80; 29/25.42

(58) Field of Classification Search .......... 427/79, 427/70, 80; 29/25.42
See application file for complete search history.

(56) References Cited

U.S. PATENT DOCUMENTS

| | | | |
|---|---|---|---|
| 6,320,742 B1 * | 11/2001 | Wada et al. | 361/528 |
| 6,519,137 B1 * | 2/2003 | Nitta et al. | 361/525 |
| 7,123,468 B2 * | 10/2006 | Kawashima et al. | 361/532 |
| 7,289,313 B2 * | 10/2007 | Takeda et al. | 361/523 |
| 2006/0223976 A1 | 10/2006 | Tozawa et al. | |
| 2008/0135810 A1 | 6/2008 | Tozawa et al. | |

FOREIGN PATENT DOCUMENTS

| | | |
|---|---|---|
| CN | 00801780 A | 11/2001 |
| CN | 1321322 A | 11/2001 |
| JP | 11-186110 A | 7/1999 |
| JP | 2001-176758 A | 6/2001 |
| JP | 2002-138137 | 5/2002 |
| JP | 2006-257288 A | 9/2006 |
| WO | 2005/014692 A1 | 2/2005 |

OTHER PUBLICATIONS

Decision to Grant Patent dated Sep. 13, 2011, issued in corresponding Japanese Patent Application No. 2007-067062.
Chinese Office Action dated Aug. 30, 2011, issued in corresponding Chinese Patent Application No. 200810086532.6.
Japanese Office Action dated May 24, 2011, issued in corresponding Japanese Patent Application No. 2007-067062.
Office Action issued in corresponding Chinese Patent Application No. 200810086532.6, mail date Mar. 17, 2011.

* cited by examiner

*Primary Examiner* — Brian K Talbot
(74) *Attorney, Agent, or Firm* — Westerman, Hattori, Daniels & Adrian, LLP

(57) ABSTRACT

The present invention provides a method of manufacturing a solid electrolytic capacitor including a step of forming a conductive polymer layer by chemical oxidization polymerization of a monomer using a solution containing a metal salt of carbon-fused bicyclic sulfonic acid as an oxidizing agent. The molar ratio X of a carbon-fused bicyclic sulfonate ion to a metal ion in the solution is less than the stoichiometric ratio Y of the metal salt of carbon-fused bicyclic sulfonic acid. This is allowed to provide a solid electrolytic capacitor with a sufficiently low equivalent series resistance (ESR) and high heat resistance.

2 Claims, 1 Drawing Sheet

METHOD OF MANUFACTURING SOLID ELECTROLYTIC CAPACITOR

BACKGROUND OF THE INVENTION

1. Field of the Invention

The present invention relates to a method of manufacturing a solid electrolytic capacitor, and particularly relates to a method of manufacturing a solid electrolytic capacitor having a conductive polymer layer as a solid electrolyte.

2. Description of the Background Art

In recent years, accompanied with digitization and realization of high frequency of electronics, a small size and a large capacity and low impedance in a high frequency range are required for the electrolytic capacitor. Furthermore, accompanied with increase in a reflow temperature due to making solder free from lead, high heat resistance is required for the electrolytic capacitor.

A solid electrolytic capacitor having a wound-type capacitor element structure has been developed and made into a practical use in which a conductive polymer such as polypyrrole and polythiophene having high conductivity is used as a solid electrolyte for such requirements of small size, large capacity, and decrease in impedance in a high frequency range (for example, Japanese Patent Laying-Open No. 11-186110). The solid electrolytic capacitor having a wound-type capacitor element structure can be produced by storing a capacitor element having an anode foil and a cathode foil wound with a separator interposed therebetween in a metal case and sealing its opening part with a sealing rubber.

Presently, polyethylenedioxythiophene (PEDT) has been used often as the conductive polymer for reasons that it has high conductivity, polymerization reaction is gradual, and it has an excellent adhesiveness with an anode dielectric film.

A wound-type solid electrolytic capacitor having a PEDT layer as the solid electrolyte can be produced by impregnating 3,4-ethylenedioxythiophene which is a monomer and an oxidizing agent into a capacitor element having an anode foil and a cathode foil wound with a separator interposed therebetween and performing chemical oxidization polymerization. Ferric paratoluenesulfonate or the like is used as the oxidizing agent for example.

However, the above-described conventional solid electrolytic capacitor is not sufficiently satisfactory in the respect of heat resistance. That is, in a reflow process of the solid electrolytic capacitor with lead-free solder, because the lead-free solder has a considerably higher melting point than that of the conventional lead solder, there is a necessity of making the solder reflow temperature a high temperature of about 200 to 270° C. However, in the conventional solid electrolytic capacitor, deterioration of electronic characteristics accompanying with deterioration of the conductive polymer such as PEDT proceeds excessively, and it becomes a problem that cannot be overlooked in the market.

SUMMARY OF THE INVENTION

The present invention is made to solve the above-described problems, and its object is to provide a solid electrolytic capacitor having a sufficiently low equivalent series resistance (abbreviated as ESR below) and high heat resistance.

The present inventors have made investigations, and as a result the inventors have found that an excessive change in electronic characteristics under a high temperature can be suppressed when a metal salt of carbon-fused bicyclic sulfonic acid is used as an oxidizing agent in chemical oxidization polymerization and that conductivity and heat resistance of the conductive polymer layer are improved by making the molar ratio of a carbon-fused bicyclic sulfonate ion to a metal ion in a solution containing the oxidizing agent used in the chemical oxidization polymerization less than the stoichiometric ratio of the metal salt of carbon-fused bicyclic sulfonic acid so that a solid electrolytic capacitor having a low ESR and high heat resistance can be obtained without deteriorating leakage current and initial capacitance and the present invention has been completed. That is, the present invention will be described as follows.

The present invention is a method of manufacturing a solid electrolytic capacitor having a conductive polymer layer as a solid electrolyte, including a step of forming a conductive polymer layer by chemical oxidization polymerization of a monomer using a solution containing a metal salt of carbon-fused bicyclic sulfonic acid as an oxidizing agent, wherein, the molar ratio X of a carbon-fused bicyclic sulfonate ion to a metal ion in the solution is less than the stoichiometric ratio Y of the metal salt of carbon-fused bicyclic sulfonic acid.

The molar ratio X of the carbon-fused bicyclic sulfonate ion to the metal ion in the above-described solution preferably satisfies the following equation (1).

$$X \geq Y-0.5 \tag{1}$$

A carbon-fused bicyclic compound constituting the above-described metal salt of carbon-fused bicyclic sulfonic acid is preferably one or more kind of compound selected from the group consisting of naphthalenesulfonic acid and tetralinesulfonic acid.

Further, a metal constituting the above-described metal salt of carbon-fused bicyclic sulfonic acid is preferably one or more kind of metal selected from the group consisting of iron (III), copper (II), chromium (VI), cerium (IV), manganese (VII), and zinc (II). Among these, iron (III) is more preferable.

Furthermore, the above-described monomer is preferably 3,4-ethylenedioxythiophene or its derivatives.

According to the method of manufacturing a solid electrolytic capacitor in the present invention, a solid electrolytic capacitor with low ESR and high heat resistance is provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention relates to a method of manufacturing a solid electrolytic capacitor having a conductive polymer layer as a solid electrolyte, and more specifically, relates to a method of manufacturing a solid electrolytic capacitor having a conductive polymer layer as a solid electrolyte in a capacitor element with an anode foil on which a dielectric film is formed and a counter cathode foil wound with a separator interposed therebetween.

Figure 1:
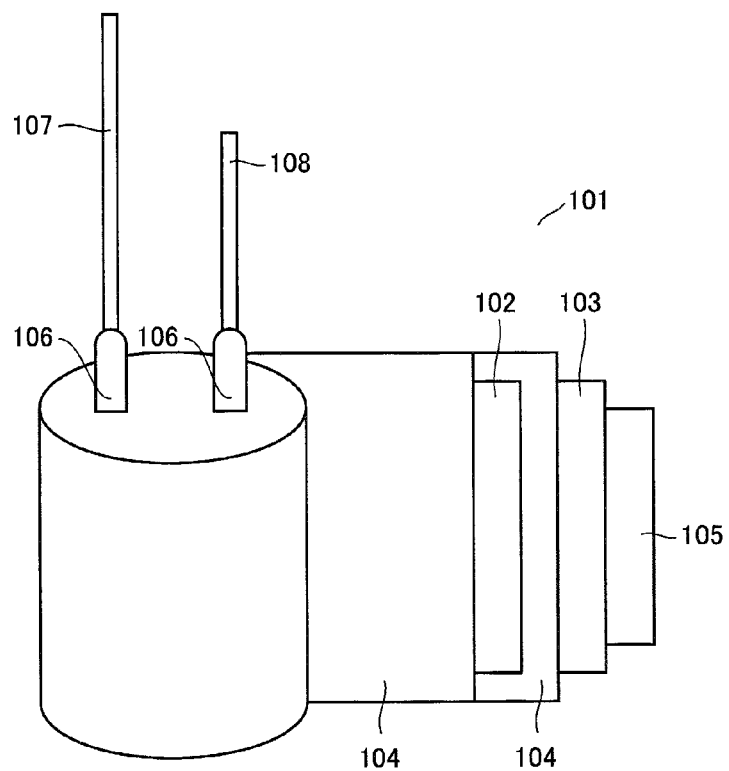
FIG. 1 is an exploded view schematically showing one example of a wound-type capacitor element preferably used in the present invention.

A wound-type capacitor element 101 with a structure as shown in FIG. 1 for example is preferably used as the capacitor element having an anode foil on which a dielectric film is formed and a counter cathode foil wound with a separator interposed therebetween. Capacitor element 101 is formed by winding an anode foil 102 in which an etching process for formation of the surface rough and a chemical conversion coating for formation of a dielectric film are performed on a foil made of a valve action metal such as aluminum, tantalum, niobium, and titanium and a counter cathode foil 103 with a separator 104 interposed therebetween. After being wound, these are fixed with a tape binder 105. An anode lead wire 107 and a cathode lead wire 108 are installed respectively to anode foil 102 and counter cathode foil 103 with a lead tab terminal 106 interposed therebetween.

In the present invention, a conductive polymer layer which is a solid electrolyte is formed inside of the wound-type capacitor element as in shown FIG. 1 by chemical oxidization polymerization of a monomer using a solution containing a metal salt of carbon-fused bicyclic sulfonic acid as an oxidizing agent. Hereinafter, the forming method of the conductive polymer layer is described in detail.

The chemical oxidization polymerization of the monomer constituting the conductive polymer layer can be performed with the following methods for example:

(a) a method of performing oxidization polymerization in the capacitor element by preparing a solution containing a monomer and an oxidizing agent solution containing a metal salt of carbon-fused bicyclic sulfonic acid and soaking the capacitor element in these solutions one by one or applying these solutions one by one, and (b) a method of performing oxidization polymerization in the capacitor element by preparing a monomer/oxidizing agent solution containing a monomer and a metal salt of carbon-fused bicyclic sulfonic acid as the oxidizing agent and soaking the capacitor element in this solution or applying this solution. In these methods, heating may be performed depending on necessity to promote the oxidization polymerization. With the above methods, a conductive polymer layer is formed in the capacitor element, specifically in the capacitor element including a gap between the anode foil and the counter cathode foil.

The carbon-fused bicyclic compound constituting the metal salt of carbon-fused bicyclic sulfonic acid contained in the above-described oxidizing agent solution or the monomer/oxidizing agent solution is not especially limited. However, examples include naphthalenesulfonic acid, tetralinesulfonic acid, decalinesulfonic acid, indenesulfonic acid, heptalenesulfonic acid, octalenesulfonic acid, and a mixture of two kinds or more of these. Among these, naphthalenesulfonic acid, tetralinesulfonic acid, octalenesulfonic acid having an aromatic property, and a mixture of two kinds or more of these are preferable. Here, "carbon-fused compound" is a cyclic sulfonic acid compound having two rings which are mainly configured with carbon atoms in which each ring shares two or more atoms.

An example of the metal configuring a metal salt of carbon-fused bicyclic sulfonic acid is a transition metal, and it is not especially limited. However, examples include one kind or two kinds or more selected from iron (III), copper (II), chromium (VI), cerium (IV), manganese (VII), and zinc (II). Among these, iron (III) is preferably contained.

Specific examples of the metal salt of carbon-fused bicyclic sulfonic acid are not especially limited. However, examples include iron (III) naphthalenesulfonate, iron (III) tetralinesulfonate, iron (III) octalenesulfonate, copper (II) naphthalenesulfonate, copper (II) tetrasulfonate, copper (II) octalenesulfonate, chromium (VI) naphthalenesulfonate, chromium (VI) tetralinesulfonate, chromium (VI) octalenesulfonate, cerium (IV) naphthalenesulfonate, cerium (IV) tetralinesulfonate, cerium (IV) octalenesulfonate, manganese (VII) naphthalenesulfonate, manganese (VII) tetralinesulfonate, manganese (VII) octalenesulfonate, zinc (II) naphthalenesulfonate, zinc (II) tetralinesulfonate, zinc (II) octalenesulfonate, and the like.

Examples of the solvent used in the preparation of the oxidizing agent solution or the monomer/oxidizing agent solution include an alcohol solvent such as methanol, ethanol, isopropyl alcohol, n-butanol, and ethylene glycol. Two kinds or more of these alcohol solvents may be mixed and used, or a mixed solvent of an alcohol solvent and a non-alcohol solvent may be used.

Further, examples of the monomer constituting a conductive polymer include pyrrole, thiophene, and their derivatives, and among these, 3,4-ethylenedioxythiophene or its derivatives are preferable.

Here, the molar ratio X of the carbon-fused bicyclic sulfonate ion to the metal ion in the oxidizing agent solution of the above-described method (a) or the monomer/oxidizing agent solution of the method (b) is made less than the stoichiometric ratio Y of the metal salt of carbon-fused bicyclic sulfonic acid. "Stoichiometric ratio Y of the metal salt of carbon-fused bicyclic sulfonic acid" means the stoichiometric ratio of the carbon-fused bicyclic sulfonate ion to the metal ion constituting the metal salt of carbon-fused bicyclic sulfonic acid. More specifically, because the stoichiometric ratio of the metal salt of carbon-fused bicyclic sulfonic acid is 3.0 in the case of using iron (III) as the metal constituting the metal salt of carbon-fused bicyclic sulfonic acid for example, the molar ratio X of the carbon-fused bicyclic sulfonate ion to the metal ion in the oxidizing agent solution or the monomer/oxidizing agent solution is made less than 3.0, preferably 2.8 or less. Similarly, in the case that the metal constituting the metal salt of carbon-fused bicyclic sulfonic acid is copper (II), chromium (VI), cerium (IV), manganese (VII), and zinc (II), the molar ratio X of the carbon-fused bicyclic sulfonate ion to the metal ion in the oxidizing agent solution or the monomer/oxidizing agent solution is made less than 2.0, less than 6.0, less than 4.0, less than 7.0, and less than 2.0, respectively.

In such a way, a solid electrolytic capacitor with low ESR and high heat resistance without deteriorating leakage current and initial capacitance can be obtained by chemical oxidization polymerization using an oxidizing agent solution or the monomer/oxidizing agent solution in which the molar ratio X of the carbon-fused bicyclic sulfonate ion to the metal ion is controlled appropriately. Such an effect is considered to be a multiplier effect of making the sulfonic acid component constituting the sulfonic acid metal salt, that is an oxidizing agent, a carbon-fused bicyclic sulfonic acid, and controlling the molar ratio X of the carbon-fused bicyclic sulfonate ion to the metal ion to be less than the stoichiometric ratio Y.

The molar ratio X of the carbon-fused bicyclic sulfonate ion to the metal ion in the oxidizing agent solution or the monomer/oxidizing agent solution preferably has a relationship of the following equation (1) with the stoichiometric ratio Y of the metal salt of carbon-fused bicyclic sulfonic acid.

$$X \geq Y - 0.5 \qquad (1)$$

Because the stoichiometric ratio of the metal salt of carbon-fused bicyclic sulfonic acid is 3.0 in the case of using iron (III) as the metal constituting the metal salt of carbon-fused bicyclic sulfonic acid for example, the molar ratio of the carbon-fused bicyclic sulfonate ion to the metal ion in the oxidizing agent solution or the monomer/oxidizing agent solution is preferably 3.0−0.5=2.5 or more. Similarly, in the case that the metal constituting the metal salt of carbon-fused bicyclic sulfonic acid is copper (II), chromium (VI), cerium (IV), manganese (VII), and zinc (II), the molar ratio X of the carbon-fused bicyclic sulfonate ion to the metal ion in the oxidizing agent solution or the monomer/oxidizing agent solution is preferably 1.5 or more, 5.5 or more, 3.5 or more, 6.5 or more, and 1.5 or more, respectively. In the case that the molar ratio X of the carbon-fused bicyclic sulfonate ion to the metal ion in the oxidizing agent solution or the monomer/oxidizing agent solution is less than (the stoichiometric ratio Y of the metal salt of carbon-fused bicyclic sulfonic acid −0.5), precipitation with a metal oxide as the main component occurs, uniform mixing of the monomer and the oxidizing agent becomes difficult, and there is a case that it is not suitable as a solution for polymerization when the monomer/oxidizing agent solution is prepared.

The specific method of preparing the above-described oxidizing agent solution or the monomer/oxidizing agent solution having the above-described carbon-fused bicyclic sulfonate ion/metal ion molar ratio is not especially limited. However, examples can include the following (i) and (ii).

(i) A method of dissolving a metal salt of carbon-fused bicyclic sulfonic acid having a composition ratio of the carbon-fused bicyclic sulfonate ion and the metal ion that are the constitutional components (the carbon-fused bicyclic sulfonate ion/metal ion molar ratio) smaller than the stoichiometric ratio into a solvent. In this case, a metal component-containing compound may be added further depending on the necessity in order to adjust the molar ratio.

(ii) A method of adding the metal salt of carbon-fused bicyclic sulfonic acid having the stoichiometric composition and the metal component-containing compound into a solvent. In this method, it is adjusted to a prescribed carbon-fused bicyclic sulfonate ion/metal ion molar ratio by adjusting the added amount of the metal component-containing compound.

Examples of a trivalent iron compound as the metal component-containing compound include ferrous sulphate ($Fe_2(SO_4)_3$) and iron hydroxide ($Fe(OH)_3$).

The metal salt of carbon-fused bicyclic sulfonic acid having a composition ratio of the carbon-fused bicyclic sulfonate ion and the metal ion (the carbon-fused bicyclic sulfonate ion/metal ion molar ratio) smaller than the stoichiometric ratio used in the above-described method (i) can be prepared using the carbon-fused bicyclic sulfonic acid and the metal component-containing compound as a raw material in such ratio. A composition ratio of the carbon-fused bicyclic sulfonate ion and the metal ion (the carbon-fused bicyclic sulfonate ion/metal ion molar ratio) that is deviated from its stoichiometric ratio is called a non-stoichiometric ratio.

Figure 2:
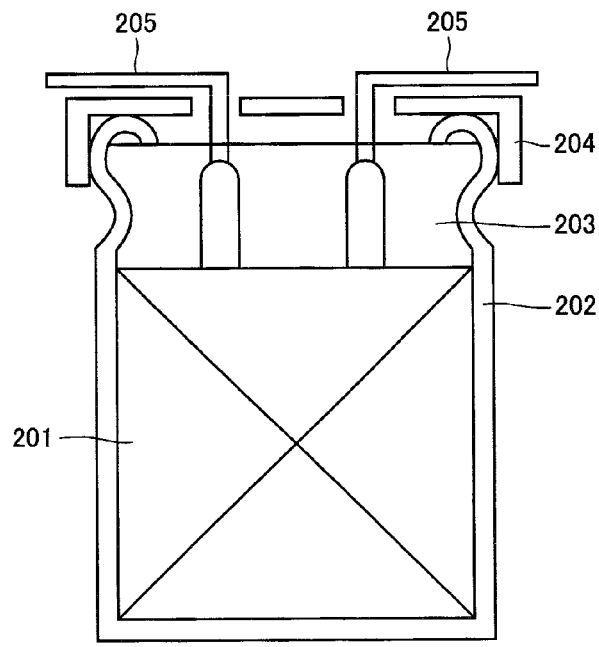
FIG. 2 is a cross-sectional view showing one example of a solid electrolytic capacitor of the present invention.

A capacitor element 201 in which the conductive polymer layer is formed inside is placed in an aluminum case 202 and fixed by inserting a rubber packing for sealing 203 as shown in FIG. 2 for example. Next, the opening of aluminum case 202 is sealed by performing a lateral reduction and a curling, and an aging treatment is performed. After that, a plastic seat plate 204 is inserted to the curled face of the capacitor, press-forming and bending are performed on the lead wires of capacitor element 201 as electrode terminals, and a solid electrolytic capacitor is completed.

The present invention is described in detail by giving Examples and Comparative Examples. However, the present invention is not limited to these.

EXAMPLES

Example 1

A wound-type capacitor element as shown in FIG. 1 was obtained by winding an anode foil made of aluminum, in which an etching treatment and a chemical conversion treatment for formation of a dielectric film were performed, and a counter cathode foil made of aluminum with a synthetic cellulose fiber separator interposed therebetween. Then, the capacitor element was heat-treated at 280° C. Next, ferric naphthalenesulfonate with a composition ratio of a carbon-fused bicyclic sulfonate ion to a metal ion (carbon-fused bicyclic sulfonate ion/metal ion molar ratio) of 2.5 as an oxidizing agent and 3,4-ethylenedioxythiophene which is a monomer were dissolved into n-butanol to prepare a monomer/oxidizing agent solution (concentration of the oxidizing agent 40% by mass). Thereafter, the capacitor element was soaked into and pulled out the solution, and the resultant capacitor element was subjected to oxidization polymerization at 150° C. to form a conductive polymer layer between the anode and the cathode in the capacitor element. Then, the capacitor element was placed in an aluminum case, fixed by inserting a rubber packing for sealing, a lateral reduction and curling were performed to seal an opening of the aluminum case, and an aging treatment was performed. After that, a plastic seat plate was inserted to the curled face of the capacitor, press-forming and bending were performed on lead wires of the capacitor element as electrode terminals, and a solid electrolytic capacitor was completed (size: 6.3 mm diameter×6 mm height). The rated voltage and rated capacitance of the solid electrolytic capacitor are shown in Table 2.

Examples 2 to 4, Comparative Examples 1 to 4

A solid electrolytic capacitor was produced in the same manner as in Example 1 except that the types of the oxidizing agent and the composition ratios of the carbon-fused bicyclic sulfonate ion to the metal ion (carbon-fused bicyclic sulfonate ion/metal ion molar ratio) were as shown in Table 1 (size: 6.3 mm in diameter×6 mm in height). The rated voltages and the rated capacitances of the solid electrolytic capacitors are shown in Table 2.

TABLE 1

|  | OXIDIZING AGENT | COMPOSITION RATIO |
|---|---|---|
| EXAMPLE 1 | FERRIC NAPHTHALENESULFONATE | 2.5 |
| EXAMPLE 2 | FERRIC NAPHTHALENESULFONATE | 2.8 |
| EXAMPLE 3 | FERRIC TETRALINESULFONATE | 2.5 |
| EXAMPLE 4 | FERRIC TETRALINESULFONATE | 2.8 |
| COMPARATIVE EXAMPLE 1 | FERRIC PARATOLUENESULFONATE | 2.5 |
| COMPARATIVE EXAMPLE 2 | FERRIC PARATOLUENESULFONATE | 2.8 |
| COMPARATIVE EXAMPLE 3 | FERRIC NAPHTHALENESULFONATE | 3.1 |
| COMPARATIVE EXAMPLE 4 | FERRIC TETRALINESULFONATE | 3.1 |

(Evaluation of Electric Characteristics)

The initial capacitance (measurement frequency 120 MHz), the initial ESR value (measurement frequency 100 kHz), and the capacitance (measurement frequency 120 Hz) and the ESR value (measurement frequency 100 kHz) after the reflow test (230 to 250° C., 30 seconds) were measured on the obtained solid electrolytic capacitor, and the change of these characteristics was evaluated. The result is shown in Table 2. The capacitance, the ESR value, and these change rates are an average value of 50 solid electrolytic capacitors.

"Capacitance change rate ΔC (%)" in Table 2 is a value calculated with the following equation.

$$\Delta C(\%) = (C - C_0)/C_0 \times 100$$

($C_0$: initial capacitance, C: capacitance after a reflow text)

Further, "ESR change rate ΔR (times)" in Table 2 is a value calculated with the following equation.

$$\Delta R(\text{times}) = R/R_0$$

($R_0$: initial ESR value, R: ESR value after a reflow text)

TABLE 2

|  | RATED VOLTAGE (V) | RATED CAPACITANCE (μF) | INITIAL CAPACITANCE $C_0$ (μF) | INITIAL ESR VALUE $R_0$ (mΩ) | CAPACITANCE CHANGE RATE ΔC (%) | ESR CHANGE RATE ΔR (TIMES) |
|---|---|---|---|---|---|---|
| EXAMPLE 1 | 4 | 150 | 153 | 27.4 | −2.7 | 1.04 |
| EXAMPLE 2 | 4 | 150 | 152 | 27.4 | −2.8 | 1.03 |
| EXAMPLE 3 | 4 | 150 | 151 | 28.7 | −3.4 | 1.10 |
| EXAMPLE 4 | 4 | 150 | 150 | 28.8 | −3.6 | 1.11 |
| COMPARATIVE EXAMPLE 1 | 4 | 150 | 149 | 33.3 | −5.5 | 1.45 |
| COMPARATIVE EXAMPLE 2 | 4 | 150 | 148 | 32.9 | −5.9 | 1.56 |
| COMPARATIVE EXAMPLE 3 | 4 | 150 | 150 | 30.9 | −4.2 | 1.18 |
| COMPARATIVE EXAMPLE 4 | 4 | 150 | 149 | 32.6 | −4.9 | 1.25 |

It was confirmed that a solid electrolytic capacitor can be provided which decreases the initial ESR and in which deterioration of electric characteristics by heat is suppressed without losing the initial capacitance by using a metal salt of carbon-fused bicyclic sulfonic acid as an oxidizing agent and making the molar ratio of the carbon-fused bicyclic sulfonate ion to the metal ion in the oxidizing agent solution or the monomer/oxidizing agent solution less than the stoichiometric ratio of the metal salt of carbon-fused bicyclic sulfonic acid.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a solid electrolytic capacitor having a conductive polymer layer as a solid electrolyte, comprising a step of forming said conductive polymer layer by chemical oxidization polymerization of a monomer using a solution containing iron (III) salt of carbon-fused bicyclic sulfonic acid as an oxidizing agent, wherein the molar ratio X of a carbon-fused bicyclic sulfonate ion to iron (III) ion in said solution is 2.5-2.8; and
    wherein a carbon-fused bicyclic compound constituting said iron (III) salt of carbon-fused bicyclic sulfonic acid is one or more kind of compound selected from the group consisting of naphthalenesulfonic acid and tetralinsulfonic acid.

2. The method of manufacturing a solid electrolytic capacitor according to claim 1, wherein said monomer is 3,4-ethylenedioxythiophene or its derivatives.

* * * * *